Oct. 4, 1966  E. FELDMAN  3,276,144
KEYBOARD CONTROLLED PHONOGRAPH
Filed Nov. 21, 1963  3 Sheets-Sheet 1

INVENTOR.
EDWARD FELDMAN
BY
George H. Fritzinger
AGENT

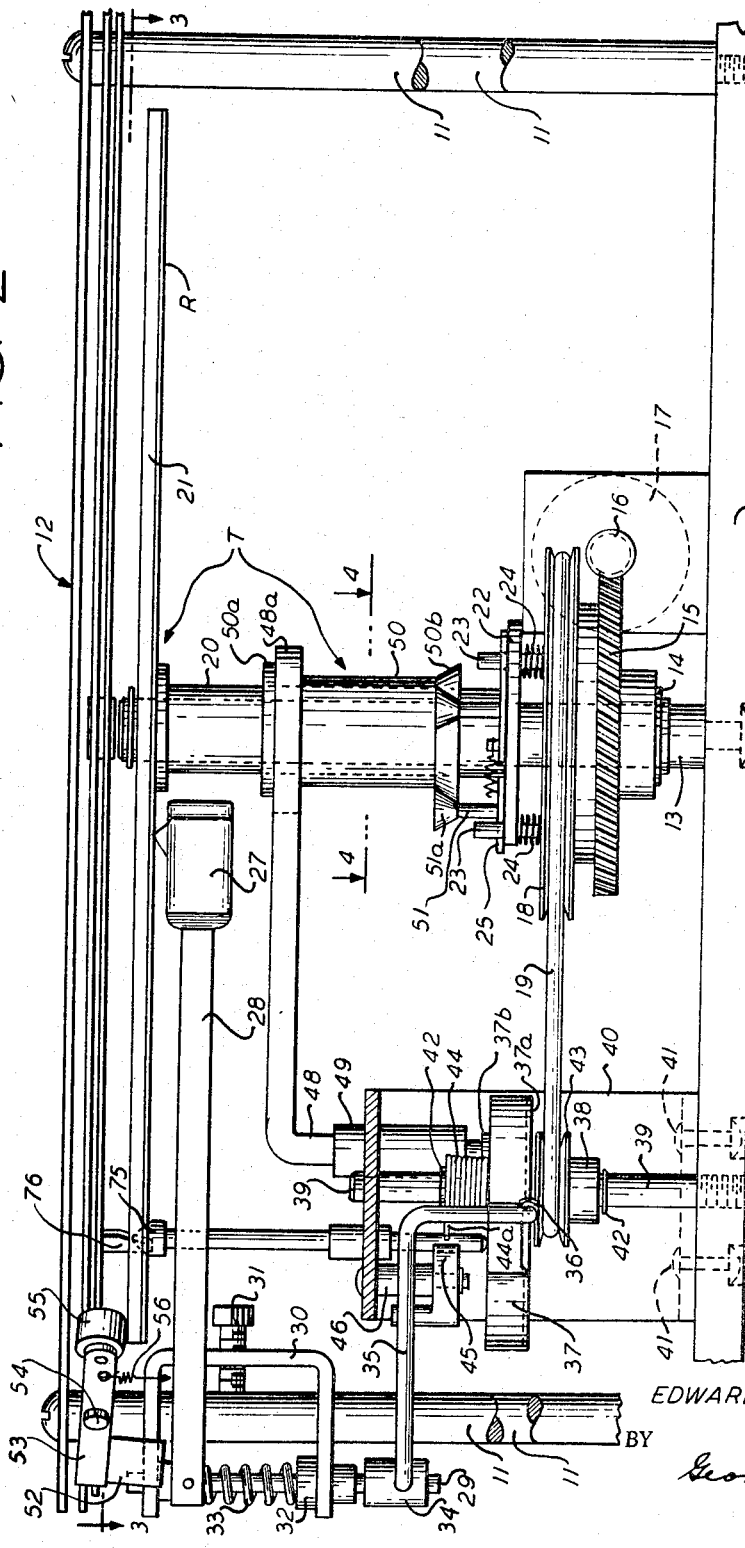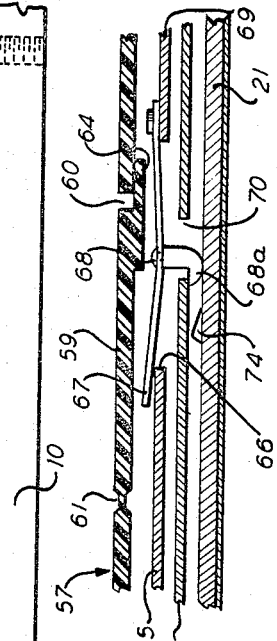

Oct. 4, 1966  E. FELDMAN  3,276,144
KEYBOARD CONTROLLED PHONOGRAPH
Filed Nov. 21, 1963  3 Sheets-Sheet 3
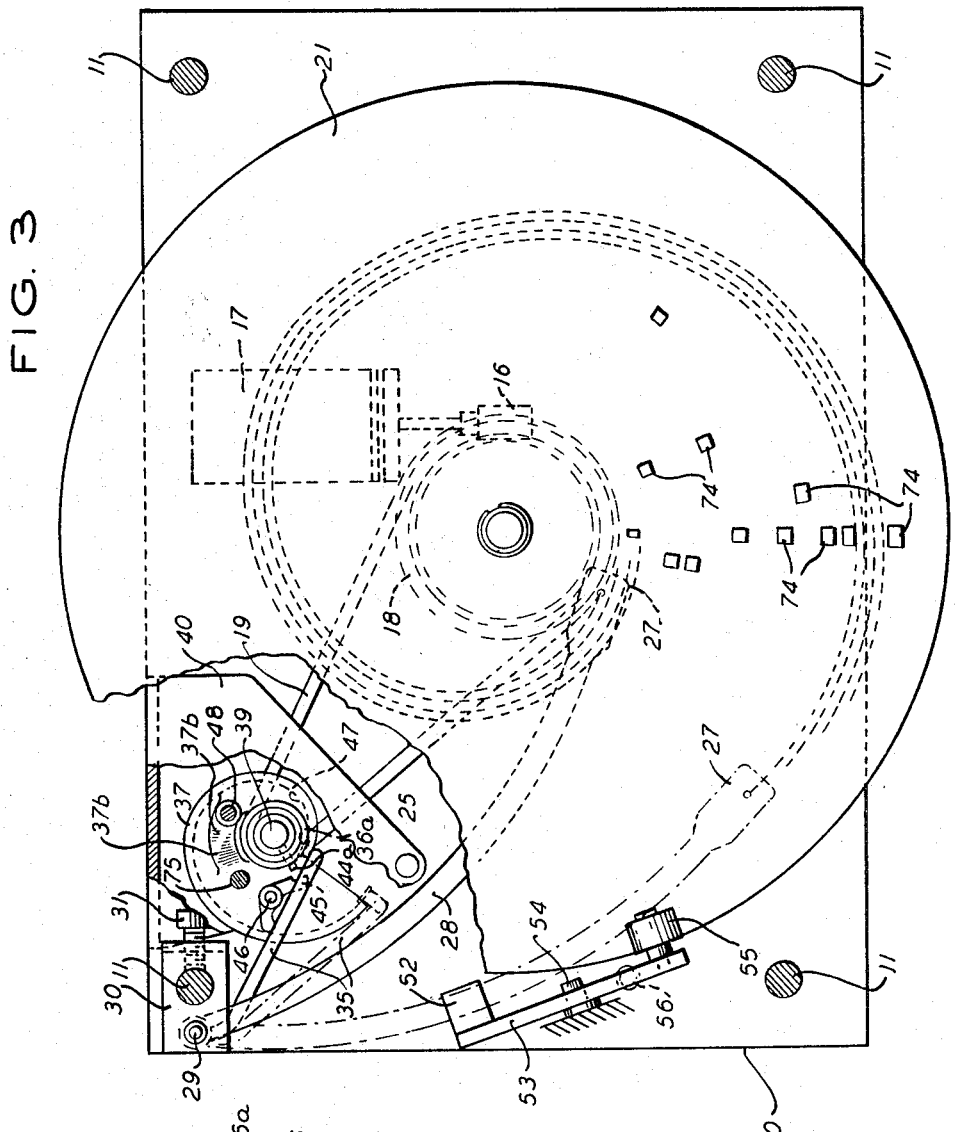
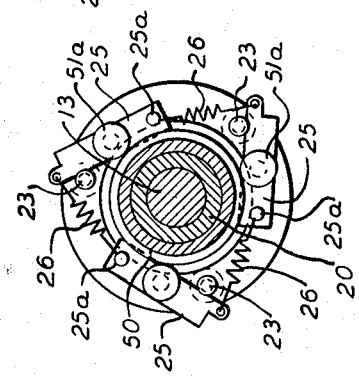
INVENTOR.
EDWARD FELDMAN
BY George H. Fritzinger
AGENT

3,276,144
KEYBOARD CONTROLLED PHONOGRAPH
Edward Feldman, New York, N.Y., assignor to McGraw-Edison Company, Elgin, Ill., a corporation of Delaware
Filed Nov. 21, 1963, Ser. No. 325,275
7 Claims. (Cl. 35—5)

This invention relates to an educational phonograph for selectively reproducing short individual recordings responsive to pressing respective keys of a keyboard, and more particularly the invention relates to such phonograph wherein the keyboard simulates that of a typewriter and each key depression activates the phonograph to pronounce the character on the respective key.

An object of the invention is to provide a simple and economical educational phonograph for aiding children to learn to recognize numbers and letters and the pronunciation thereof at an early age.

Another object is to provide such an educational phonograph which will aid children in acquiring the dexterity to operate a typewriter keyboard.

Another object is to provide a small compact design of such keyboard type of phonograph which is dependable and convenient to operate.

Other objects and features of my invention will be apparent from the following description and the appended claims.

In the description of my invention reference is had to the accompanying drawings, of which:

FIGURE 2 is a front elevational view of the machine;

FIGURE 3 is a top view of the machine taken on the line 3—3 of FIGURE 2 but with a portion broken away;

FIGURE 4 is a sectional view taken on the line 4—4 of FIGURE 2; and

FIGURE 5 is a sectional view through the keyboard taken on the line 5—5 of FIGURE 1.

Figure 1:
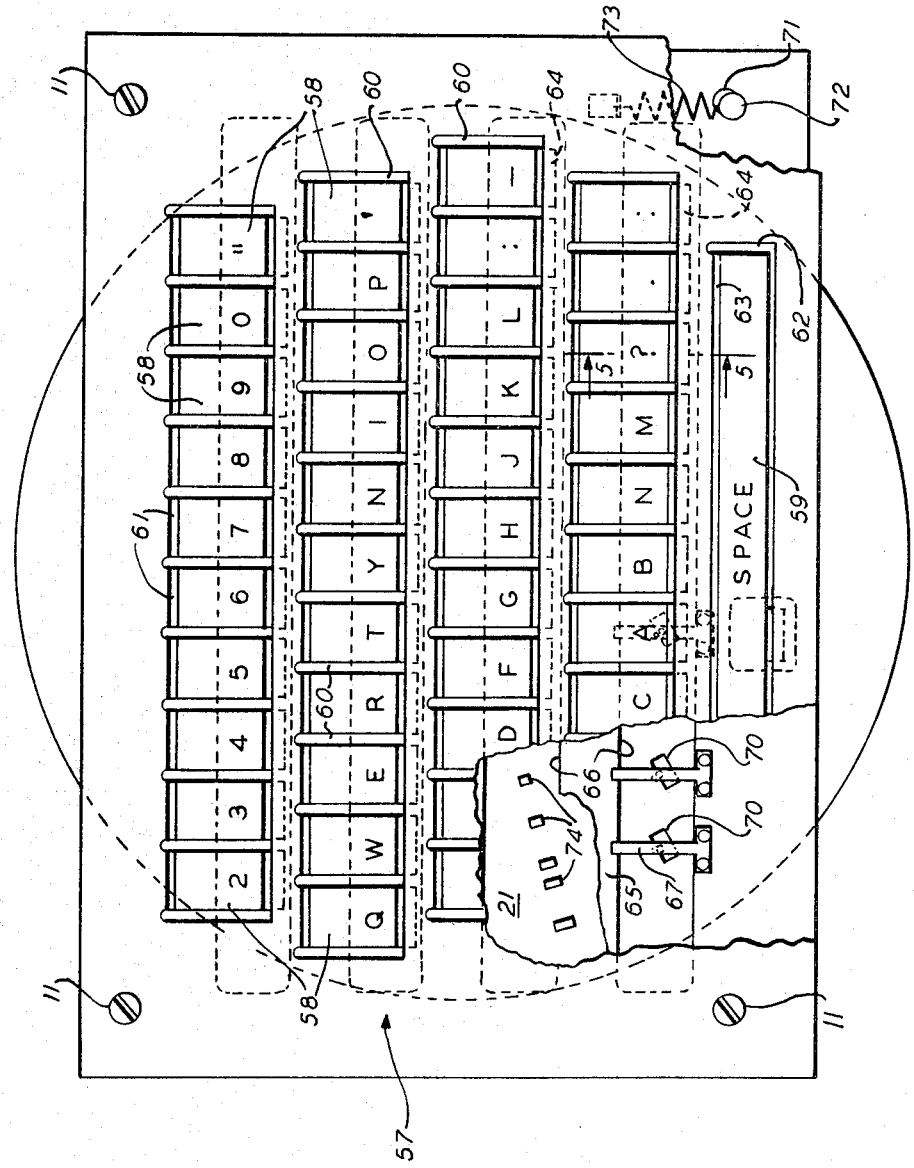
FIGURE 1 is a top plan view of the present machine with a portion broken away.

The present phonograph has a rectangular base plate 10 provided with four upright posts 11 at the corner portions thereof. Mounted on the upper ends of these posts is a keyboard 12 herein later described. Staked to a central portion of the base plate is an upright post 13 having a shoulder 14 near its lower end serving as a vertical support for a turntable structure T. This turntable structure includes a rotary gear 15 resting on the shoulder 14 and driven through a worm 16 by a motor 17. Secured to the upper face of the gear 15 is a pulley 18 in which runs a belt 19 for driving a control mechanism later described. Slidably mounted on the post 13 above the pulley 18 is long depending hub 20 of a turntable 21. The hub is coupled rotatably to the pulley 18 with freedom to shift vertically by means of a flange 22 at the bottom of the hub aperture to slidably receive three equally spaced vertical studs 23 mounted on the upper side of the pulley. On the studs between the flange 22 and pulley 18 are respective compression springs 24 for yieldably supporting the turntable in a raised or normal position. Pivoted on respective studs 25a to the flange 22 are three latches 25 which extend past the outer sides of the stud 23. The latches are biased inwardly by tension springs 26 connected between the latches and the pivot studs 25a of the next adjacent latches. When the turntable is pressed downwardly by the keyboard 12, as herein later described, these latches engage notches in the respective studs 23 to hold the turntable in its depressed position.

Secured to the bottom face of the turntable is a disk record R bearing a recording on its bottom face. This recording comprises a spiral groove for each key of the keyboard leading from the outer peripheral border of the turntable to a central hub area thereof as indicated in FIGURE 3. Below the turntable is a pickup 27 for engaging the record R. The pickup is mounted on an arm 28 which is pinned at its outer end to a vertical shaft 29 beyond the turntable. The shaft 29 is mounted slidably and rotatably in apertured end portions of the legs of a U bracket 30. The legs of this bracket are also centrally apertured to receive one of the four posts 11. Threaded through the cross portion of the bracket is a heavy set screw 31 which is tightened with pressure against the respective post to hold the bracket firmly thereon. On the shaft 29 between the pickup arm 28 and a bearing 32 in the lower leg of the bracket is a compression spring 33 which urges the pickup arm upwardly into its raised or normal position wherein the pickup is in position to engage the underside of the disk record R with a light pressure when the turntable is pressed into its depressed latched position.

Secured to the lower end of the shaft 29 below the bracket 30 is a collar 34 to which is secured a control arm 35. This control arm extends along the pickup arm at a distance therebelow, and then curves downwardly and next in a sidewise direction to terminate a horizontal cam follower finger 36. The end of the finger is flanged to provide a head 36a thereon. This finger 36 extends beneath a spiral cam 37 journaled on a sleeve 38 itself journaled on a vertical post 39. The post is supported by the base plate 10 at its lower end and by a bracket 40 at its upper end, the bracket itself being riveted to the base plate at 41. The sleeve 38 is confined vertically on the post by retainer rings 42. A pulley 43 staked to the sleeve is driven by the belt 19 during rotation of the turntable. A one-revolution integrating clutch spring 44 embraces the upper portion of the sleeve 38 and is secured at its inner end to the cam disk 37. This clutch spring has a radially extending tail or dog 44a at its outer end which is held normally latched by a pawl 45 pivoted to a stud 46 depending from the top portion of the bracket 40. While the clutch spring is so latched the cam 37 is held stationary, but the instant the clutch spring is unlatched it grips the sleeve to start driving the cam with the sleeve. If the pawl is returned within the time interval of any one revolution of the cam it latches the spring at the end of that revolution to stop the cam at that point. In the present instance, as will appear, the pawl is returned within the first revolution to limit each actuation of the cam to a single revolution of movement.

On the underside of the cam 37 is a narrow dwell or ridge 37a which starts at a point 47 at a short distance from the inner end of the spiral cam—and extends along the periphery to the outer end of the spiral cam. As the pickup 27 reaches the inner end of a spiral groove on the record R the cam follower finger 36 moves underneath the cam 37 just ahead of the ridge 37a. At the same time as the cam follower finger 36 moves below the cam 37 the control arm 35 moves against the latch 45 to release it from the dog 44a. The clutch spring 44 is thus engaged to start the cam rotating in a clockwise direction (FIGURE 3) in unison with the sleeve 38. In the initial portion of this movement the finger 36 rides onto the ridge 37a to lower the pickup arm and disengage the pickup 27 from the record R. In the continued rotation of the cam the engagement of the control arm 35 with the periphery of the spiral cam 37 causes the pickup arm to be swung outwardly to its start position. In the initial portion of this outward swinging movement of the pickup arm the latch pawl 45 is released and returned by spring means (not shown) into a latching position to limit the rotation of the spiral cam to a single revolution. During this revolution of the spiral cam the cam follower finger is retained in peripheral contact with the cam by the head 36a engaging the inner edge of the ridge 37a. When the cam 37 has completed its single revolution of movement the outer end of the ridge 37a has moved past the cam follower finger, as dottedly shown in FIGURE 3, to free the pickup arm from the cam so that the pickup is returned to its normal level and is freed again to swing inwardly across the bottom face of the record R.

As before explained, the turntable is depressed into a latched operate position by the keyboard 12 to start the engagement of the stylus of the pickup 27 with a spiral groove on the record R. A further action performed by the cam 37 at the end of each revolution of movement thereof is to unlatch the turntable so that it is snapped upwardly to its normal level. This is performed by a lobe 37b on the upper face of the cam 37. This cam lobe rides below a plunger 48 to raise the plunger as the cam follower finger 36 rides off of the ridge 37a. The plunger is slidably mounted in a bearing 49 staked in the bracket 40. Above the bearing the plunger has a right angle bend to extend horizontally to the center of the turntable, and at the end portion thereof it terminates in a fork 48a. This fork embraces a sleeve 50 on the hub 20 of the turntable. The sleeve 50 has a collar 50a above the fork 48a and has a frusto-conical cam 50b at its lower end. Upstanding from the latches 25 are studs 51 having frusto-conical heads 51a the inner portions of which overlie the cam 50b. When at the end of a revolution of movement of the spiral cam 37 the lobe 37b rides under the plunger 48 the sleeve 50 is raised to bring the cam 50b against the heads 51a to unlatch the pawls 25. Thus, the turntable is unlatched at the same time that the cam follower finger 36 rides off of the ridge 37a to cause the turntable and pickup to be elevated together to their normal levels after the pickup arm has been returned to its outward position.

In order that the pickup arm will be retained in its outward position until the turntable is again depressed by the keyboard 12, to assure a correct engagement of the pickup with the selected spiral groove on the record R, a friction pad 52 is brought to bear against the pickup arm responsive to the raising of the turntable to its normal level. This pad 52 is mounted on one end of a rocker 53 pivoted centrally on a stud 54 to the frame. Journaled on the other end of the rocker is a roller 55 which overlies the rim of the turntable and against which the roller is held in contact by a tension spring 56 acting on the rocker. As the turntable is unlatched to spring upwardly to its normal level the pressure pad is moved downwardly against the pickup arm to hold the same frictionally in place. When the turntable is later pressed downwardly by the keyboard 12 to bring a pickup into engagement with a selected groove on the record R, the pressure pad 52 is released from the pickup arm just prior to the stylus of the pickup engaging a selected groove, thus leaving the pickup free to swing inwardly in tracking engagement with the groove.

The keyboard 12 comprises a top plate 57 of suitable plastic, preferably polypropylene, molded with four rows of integrally formed keys 58 and a space bar 59 all simulating the keyboard of a typewriter. Each individual key is rectangularly shaped and formed by molding a thin slit 60 through the plate 57 along three sides of the key and by molding a recess 61 forming in effect an undercut to provide the key with a flexure hinge along its fourth side. Likewise, the space bar 59 is formed by a slit 62 along three sides and a recess 63 along the fourth side. Each key and space bar is also provided with a depending boss 64 on the underside near the outer end thereof as shown in FIGURE 5.

Mounted below the plate 57 in spaced relation thereto is a metal plate 65 having a rectangular opening 66 registering with each key. Bridging each opening 66 is a cantilever spring 67 riveted to the top side of the plate 65 near an edge of the opening. Each spring 67 is biased slightly upwardly and engaged centrally thereof by the boss 64 of the respective key 58.

Riveted to a central portion of each spring 67 is a depending stud 68 of a hook shape directed in line with the cantilever spring towards the free end thereof and provided with an upwardly inclined cam face 68a at the bottom side. Mounted below the metal plate 65 in spaced relation thereto is a latch plate 69 having an opening 70 registering with each stud 68. This latch plate is mounted for slight pivotal movement about the axis of the turntable as a center permitted by oblong slots 71 through which mounting studs 72 pass to secure the latch plate to the four posts 11 (FIGURE 1). Also, the latch plate is biased counterclockwise by a tension spring 73. In this biased position the hook portions of the studs 68 overlie edge portions of the respective openings 70. When a key 58 is depressed it moves against the central portion of the respective cantilever spring 67 moving the stud 68 downwardly, and the stud in turn moves against the latch plate causing it to be cammed clockwise until the hook portion of the stud has passed through the opening 70 whereupon the latch plate is snapped counterclockwise to lock the stud 68 in its depressed position.

On the top face of the turntable below the latch plate are raised cam ridges 74 at different radial distances from the axis of the turntable corresponding to the radial distances of the studs 68 associated with the keys 58 (FIGURE 3). There are not as many cam ridges 74 as studs 68 because several studs around the keyboard can be at the same radial distance for coaction with the same cam ridge. The arrangement of cam studs and cam ridges is such that the respective coactions occur at a different angular position of the turntable for each key depressed. Further, the spiral grooves on the bottom face of the record are positioned to start directly below the pickup 27 at these different angular positions. Thus, when a key 58 is depressed into a latched position, while the turntable is rotating, the turntable turns at an elevated level to the point where the stud 68 of the key engages the respective cam ridge 74 whereupon the turntable is cammed downwardly to engage the pickup with the outer end portion of the respective spiral groove and to latch the turntable in its lower position so that it will continue to rotate at this level. The pickup 27 having been thus engaged with the outer portion of the respective groove is carried inwardly by the groove in scanning relation thereto to reproduce the prerecording in the groove. By prerecording the spiral grooves with pronunciations of the characters of the respective keys, the machine will pronounce the character corresponding to a respective key when the key is depressed.

When the pickup has scanned a spiral groove to the inner hub portion of the disk record the turntable is unlatched to move upwardly to its normal level and to disengage the pickup therefrom as before described. Also, shortly after the turntable is so unlatched from its lower level, a plunger 75 is cammed upwardly by the top ridge 37b of the cam 37 to move against a cam finger 76 on the latch plate and turn the latch plate clockwise to unlatch the stud 68 so that the depressed key will snap upwardly to its normal level responsive to the bias action of the respective cantilever spring 67. When the depressed key has been so unlatched the machine is restored to its initial condition awaiting the pupil to depress another key of the keyboard.

The embodiment of my invention herein particularly shown and described is intended to be illustrative and not limitative of my invention since the same is subject to changes and modifications without departure from the scope of my invention which I endeavor to express according to the following claims.

I claim:
1. A phonographic reproducer for selective playing individual grooves on a disk record, each of said grooves extending in a spiral from the outer peripheral border of the disk record through approximately one revolution to a central hub area of the disk record, comprising a rotatable turntable for carrying said disk record, a pickup pivotally mounted to swing from the peripheral border of the disk record to said central hub area thereof, a mounting for said turntable and pickup permitting relative shifting movement thereof in directions along the axis of the turntable to engage and disengage the pickup with and from the mounted disk record, a cam disk, means for rotating said turntable and cam disk in unison, means responsive to axial shifting movement of said cam disk to produce a relative shifting movement between said turntable and pickup whereby to engage the pickup with the mounted disk record, said cam disk having a multiplicity of raised cammed surfaces on one face thereof respectively at different radial distances from the axis of the cam disk, a keyboard overlying said one face of said cam disk having a multiplicity of depressible keys with character designations thereon, each of said keys having a depending cam member at a radial distance from the axis of said cam disk equal to the radial distance of a respective one of said raised cam surfaces from said axis and each of said raised cam surfaces and respective depending cam members being relatively oriented about the axis of said cam disk to cause the pickup to engage the mounted disk record at a separate angular position of the turntable for each key depressed, said spiral grooves starting respectively at said separate angular positions of said turntable and said spiral grooves bearing recordations pertaining to the character designations on the corresponding keys of said keyboard whereby upon depressing one of said keys the pickup is engaged with the corresponding spiral groove to reproduce the recorded pronunciation of the character on said key.

2. The phonographic reproducer set forth in claim 1 including means activated by movement of said pickup arm to said central hub area for disengaging the pickup arm from the disk record and thereupon returning the pickup arm to the outer peripheral border of the disk record.

3. The phonographic reproducer set forth in claim 2 including means activated upon return of said pickup arm to the outer periphery of the disk record for shifting said turntable and pickup arm into their original positions along the axis of the turntable which they occupied before the selected key was depressed.

4. A phonographic reproducer for selectively playing individual grooves on a disk record, each of said grooves extending in a spiral from the outer periphereal border of the disk record through approximately one revolution to a central hub area of the disk record, a rotatable turntable mounted in an axially vertical position for carrying a disk record on the bottom surface thereof, said turntable being mounted for vertical shifting movement, means for constantly rotating said turntable, spring means for normally holding said turntable in a raised position, a detent for releasably retaining the turntable in a lowered position when the turntable is pressed downwardly, a pickup arm with a reproducer head mounted for traversal movement across the disk record from the outer peripheral border thereof to the central hub area thereof, means mounting said pickup arm for vertical shifting movement, cam means normally holding said pickup arm in a raised position free of said disk record, a multiplicity of raised cam surfaces on the upper face of said turntable each at a different radial distance from the axis of the turntable, a keyboard overlying said turntable having a multiplicity of keys with character designations thereon, each of said keys having a depending cam member for engaging a respective one of said raised cam surfaces and causing the turntable to be cammed downwardly into a detented position to engage the disk record with said reproducer head when the turntable is in a predetermined angular position, said keys and raised cam surfaces being arranged to cause the turntable to be pressed downwardly at respective angular positions depending upon the key depressed, said disk record bearing a different spiral groove for each of said keys starting at the record engaging position of said reproducer head corresponding to the respective key and each of said spiral grooves bearing a recordation pertaining to the character designated on the respective key.

5. The combination set forth in claim 4, wherein said pickup arm cam means is coupled to said pickup arm and turntables to (1) lower the pickup arm to disengage the head from the disk record, (2) return the pickup arm to the outer periphery of the disk record, and (3) raise said turntable from its lowered detent position and to raise correspondingly the pickup arm while maintaining the same disengaged from the disk record, drive means for rotating said cam means, and a one-revolution clutch between said cam means and said drive means engaged by movement of said pickup arm across the disk record to said central hub area for driving the cam means through one revolution to perform the aforestated operations of said cam means in the sequence named.

6. A phonographic reproducer including a turntable mounted for both rotational and axial shifting movements, a record disk on said turntable provided with a spiral track, a pickup arm having a pickup for engaging said record disk, means mounting said pickup arm for both rotational and axial shifting movements, means normally holding said turntable and pickup arm in axially shifted positions wherein the pickup is free of said record disk, drive means for rotating said turntable, means for shifting said turntable in the direction of the axis thereof to bring said record disk into engagement with said pickup and cause the pickup to scan said record track, cam means operative during a single revolution thereof to shift said pickup arm to disengage the pickup from the record disk, rotate the pickup arm to return the pickup to its starting position, and to shift the pickup arm and turntable in unison to return the same to their normal shifted positions, and clutch means engaged by the pickup arm when the pickup has scanned to the end of said record track for coupling said cam means to said drive means to rotate the cam means through one revolution whereby the aforestated operations of the cam means are performed in the sequence named as an incident to the pickup scanning to the end of said record track.

7. A phonographic reproducer including a turntable mounted for both rotational and axial shifting movements, a record disk on said turntable provided with a series of spiral tracks leading from the outer peripheral border to the hub portion of the disk record, a pickup arm having a pickup for engaging said record disk, means mounting said pickup arm for rotational movement to allow said pickup to scan said respective tracks, drive means for rotating said turntable, a keyboard having a series of respective depressible keys, and means coupling said keyboard to said turntable for axially shifting the turntable at different angular positions to engage said pickup selectively with said respective record tracks when corresponding keys of said keyboard are depressed.

References Cited by the Examiner
UNITED STATES PATENTS

| 1,655,510 | 1/1928 | Runyan | 35—9 |
| 2,256,578 | 9/1941 | Routin | 274—14 |
| 2,547,603 | 4/1951 | Segal et al. | 35—35 X |
| 2,690,697 | 10/1954 | Racca | 88—28 |
| 3,118,679 | 1/1964 | Lyon | 274—9 |
| 3,136,072 | 6/1964 | Ross | 35—5 |
| 3,168,318 | 2/1965 | Lea | 274—14 |

EUGENE R. CAPOZIO, *Primary Examiner.*

S. M. BENDER, *Assistant Examiner.*